(12) United States Patent
Chen et al.

(10) Patent No.: US 12,198,655 B2
(45) Date of Patent: Jan. 14, 2025

(54) IMAGE ADJUSTING METHOD AND IMAGE ADJUSTING DEVICE

(71) Applicant: MEDIATEK INC., Hsin-Chu (TW)

(72) Inventors: Wan-Ting Chen, Hsinchu (TW); Shuo-Li Shih, Hsinchu (TW); Tsu-Ming Liu, Hsinchu (TW); Chih-Kai Chang, Hsinchu (TW); Kuo-Chen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 108 days.

(21) Appl. No.: 17/981,486

(22) Filed: Nov. 7, 2022

(65) Prior Publication Data

US 2023/0162700 A1    May 25, 2023

Related U.S. Application Data

(60) Provisional application No. 63/283,246, filed on Nov. 25, 2021.

(51) Int. Cl.
  *G09G 5/02* (2006.01)
  *G06T 5/40* (2006.01)
  *G06V 10/764* (2022.01)

(52) U.S. Cl.
  CPC .......... *G09G 5/02* (2013.01); *G06T 5/40* (2013.01); *G06V 10/764* (2022.01); *G09G 2320/0626* (2013.01); *G09G 2320/0666* (2013.01)

(58) Field of Classification Search
  None
  See application file for complete search history.

(56) References Cited

U.S. PATENT DOCUMENTS

| | | | |
|---|---|---|---|
| 6,256,425 B1 | 7/2001 | Kunzman | |
| 10,861,384 B1 * | 12/2020 | Yang | G09G 3/3208 |
| 2003/0179192 A1 | 9/2003 | Allen | |
| 2007/0296875 A1 | 12/2007 | Allen | |
| 2009/0051642 A1 * | 2/2009 | Huang | G09G 3/3426 345/102 |
| 2017/0256192 A1 * | 9/2017 | Knepper | G09G 3/3607 |
| 2020/0410928 A1 * | 12/2020 | Yang | G09G 3/3208 |

FOREIGN PATENT DOCUMENTS

| | | |
|---|---|---|
| CN | 109963134 A | 7/2019 |
| CN | 110012278 A | 7/2019 |
| CN | 110113536 A | 8/2019 |
| CN | 110728962 A | 1/2020 |
| CN | 113240757 A | 8/2021 |
| TW | 454424 | 9/2001 |

* cited by examiner

*Primary Examiner* — Ryan M Gray
(74) *Attorney, Agent, or Firm* — Winston Hsu

(57) ABSTRACT

An image adjusting method applied to an image adjusting device of a display panel includes applying content analysis to an original image, determining one related specific light power saving mode to reduce intensity of specific color of the original image in accordance with a result of the content analysis, and executing the related specific light power saving mode.

20 Claims, 5 Drawing Sheets

IMAGE ADJUSTING METHOD AND IMAGE ADJUSTING DEVICE

CROSS REFERENCE TO RELATED APPLICATIONS

This application claims the benefit of U.S. Provisional Application No. 63/283,246, filed on Nov. 25, 2021. The content of the application is incorporated herein by reference.

BACKGROUND

With the advanced technology, the portable electronic device with the display panel has the anti-blue light function to reduce an intensity of blue color of an image displayed on the display panel for eye protection. However, the conventional anti blue light function is used to reduce pixel value of the image by the same amount or in the same proportion. The conventional anti blue light function cannot identify color temperature of the image, and therefore the image processed by blue light reduction does not have preferred image quality, and power saving efficiency resulted from the conventional anti blue light function cannot achieve preferred performance if the original image is a high color temperature image.

SUMMARY

The present invention provides an image adjusting method with several power saving modes suitable for different scenarios and a related image adjusting device for solving above drawbacks.

According to the claimed invention, an image adjusting method applied to a display panel includes applying content analysis to an original image, determining one related specific light power saving mode to reduce intensity of specific color of the original image in accordance with a result of the content analysis, and executing the related specific light power saving mode.

According to the claimed invention, an image adjusting device applied to a display panel includes an operation processor adapted to apply content analysis to an original image, determine one related specific light power saving mode to reduce intensity of specific color of the original image in accordance with a result of the content analysis, and execute one related specific light power saving mode.

The image adjusting method and the image adjusting device of the present invention can utilize the content analyzer to detect the scenario mode of each frame in the image stream, and choose one of the plurality of specific light power saving modes in accordance with the detected scenario mode to adjust color intensity of the original image, so as to make less color shift of different scenarios and achieve advantages of the preferred image quality and the preferred power saving efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
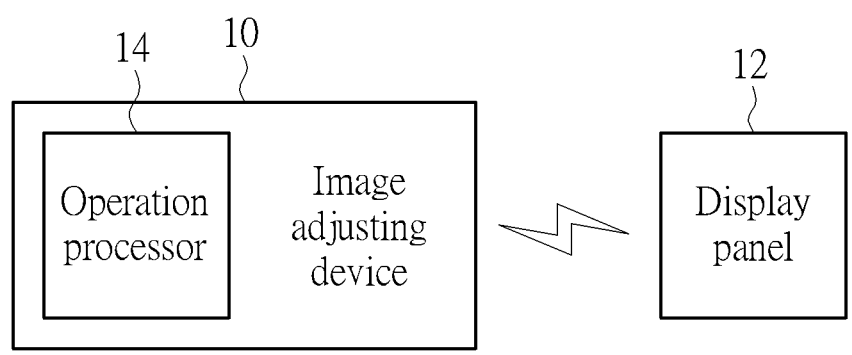
FIG. 1 is a functional block diagram of an image adjusting device according to an embodiment of the present invention.

Please refer to FIG. 1. FIG. 1 is a functional block diagram of an image adjusting device 10 according to an embodiment of the present invention. The image adjusting device 10 can be separated from but electrically connected to a display panel 12, or can be a built-in element of the display panel 12. The image adjusting device 10 may be used in a mobile phone, a tablet computer, a notebook computer or a desktop computer, and can include an operation processor 14 adapted to analysis a current scenario mode of an original image from the display panel 12, so as to accordingly reduce intensity of specific color of the original image which is intended to be displayed on the display panel 12 for providing advantages of power economy and preferred lifespan.

The image adjusting device 10 can use content analyzer to acquire a color temperature of the original image, and then choose one of a specific light power saving modes to adjust the intensity of the specific color adaptively per frame in an image stream. In one possible embodiment, the display panel 12 may have a blue color lighting unit, a green color lighting unit and a red color lighting unit; the blue color lighting unit is an unstable emitter, and performance of the blue color lighting unit is poor than performance of the green color lighting unit and the red color lighting unit. The specific light power saving mode can be applied for reducing intensity of blue color in the original image, and the intensity of the blue color that is moderately reduced can be beneficial to the power economy and the lifespan of the display panel 12.

Therefore, each of the original images in the stream can be classified into several scenario modes, such as a first scenario mode and a second scenario mode at least. The first scenario mode may be relevant to a high color temperature image or a cooler image or a bluish image, and the second scenario mode may be relevant to a low color temperature image or a warmer image or a reddish image. The image adjusting device 10 can contain several specific light power saving modes, such as a first specific light power saving mode and a second specific light power saving mode at least. The first specific light power saving mode has large reduction and can be suitable for the first scenario mode, and may be interpreted as a higher power saving mode for long time use and reading comfort. The second specific light power saving mode has less reduction and can be suitable for the second scenario mode, and may be interpreted as a normal power saving mode for vivid display. A number of the specific light power saving modes can correspond to a number of the scenario modes.

If one frame (which means the original image) of the image stream is analyzed as the first scenario mode, a function of any specific light power saving mode can be turned on, or the first specific light power saving mode with the large reduction can be turned on for dropping the intensity of the blue color of all pixels within the original image. If the frame in the image stream is analyzed as the second scenario mode, the function of specific light power saving modes can be turned off, or the second specific light power saving mode with the less reduction can be turned on for keeping initial color of the original image without serious color shift.

Figure 2:
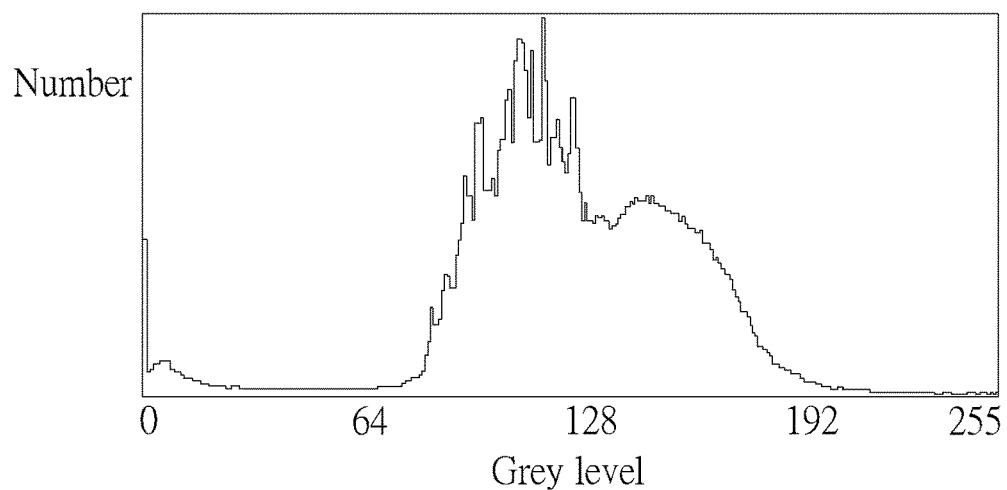
FIG. 2 is a diagram of distribution of red light pixels within the high color temperature image according to the embodiment of the present invention.
Figure 3:
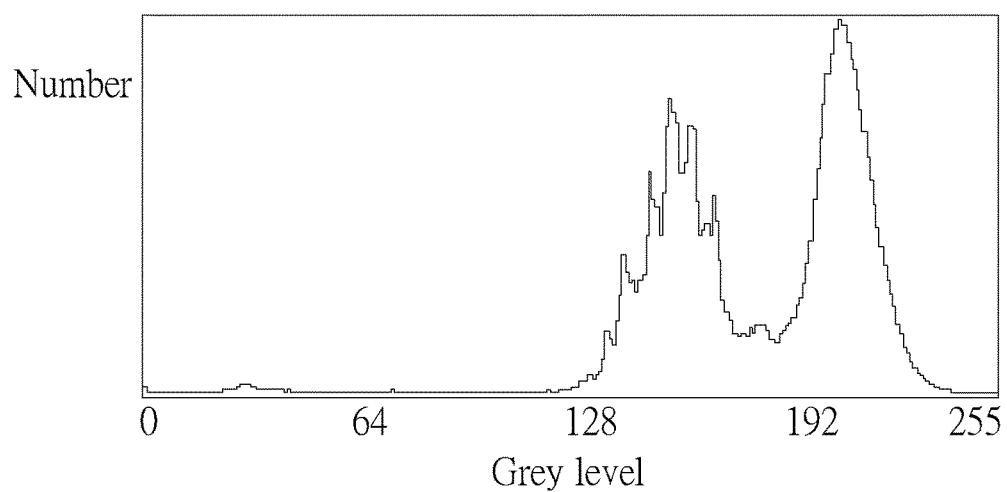
FIG. 3 is a diagram of distribution of green light pixels within the high color temperature image according to the embodiment of the present invention.
Figure 4:
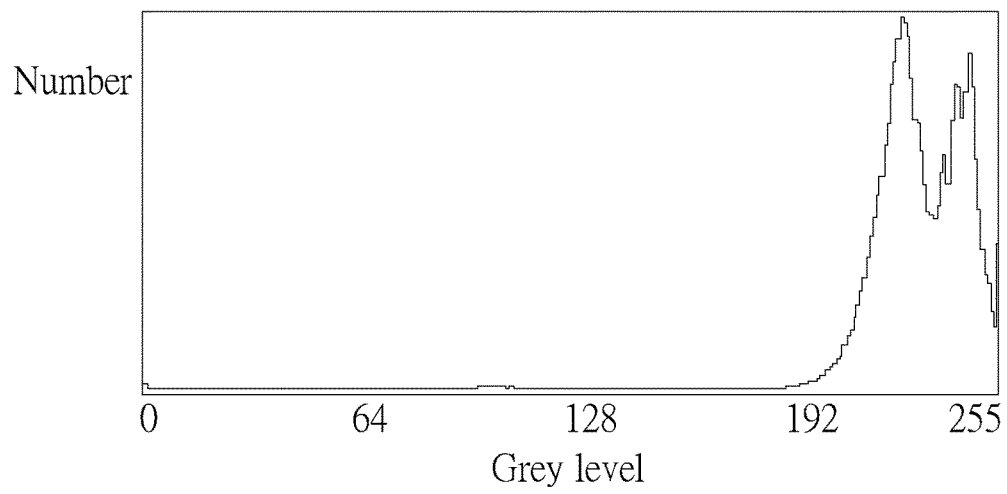
FIG. 4 is a diagram of distribution of blue light pixels within the high color temperature image according to the embodiment of the present invention.
Figure 5:
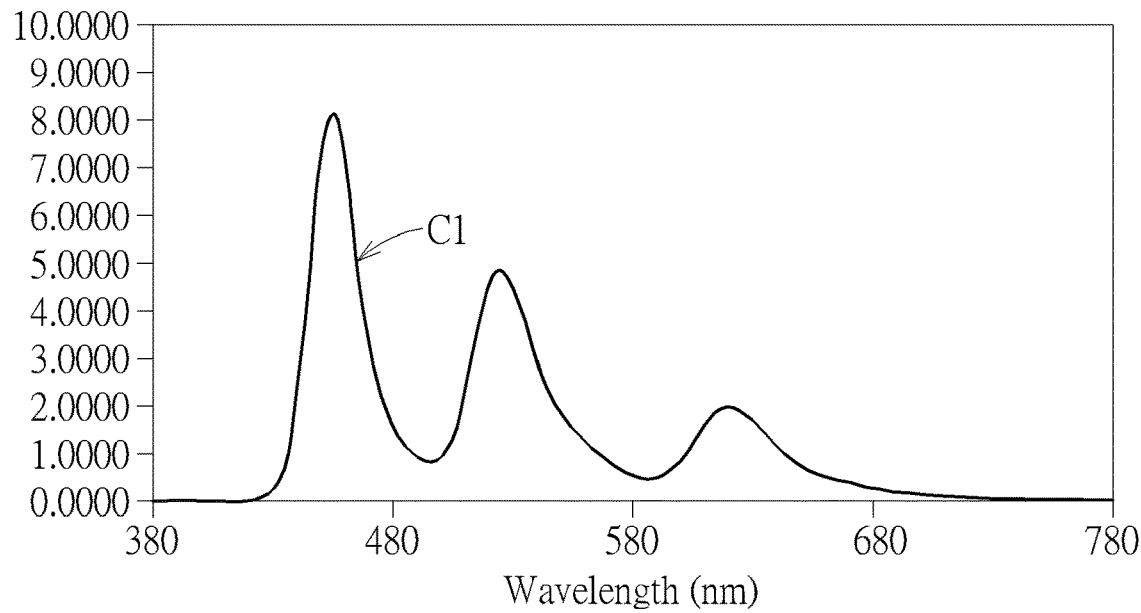
FIG. 5 is a diagram of a result of the content analyzer applied to the high color temperature image according to the embodiment of the present invention.
Figure 6:
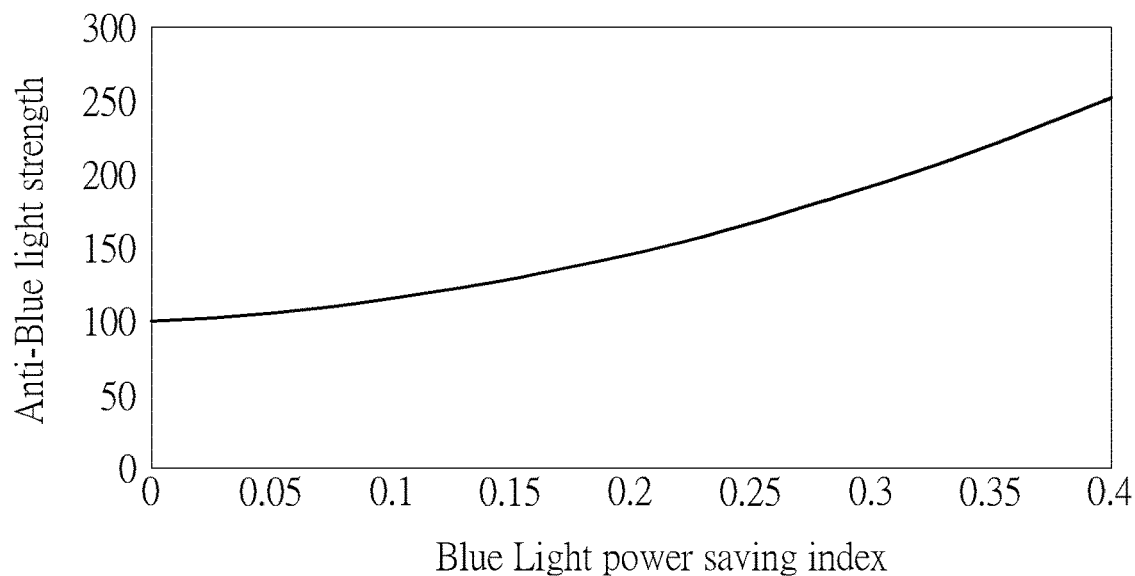
FIG. 6 is a diagram of a regression line for adjusting the bluish image according to the embodiment of the present invention.
Figure 7:
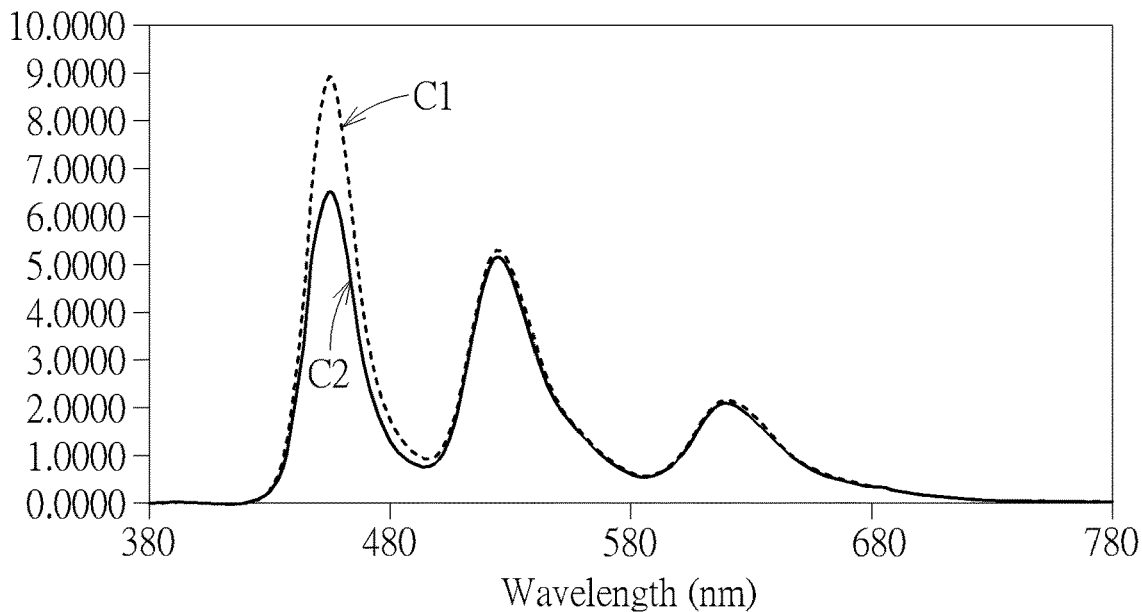
FIG. 7 is a diagram of color light distribution of the adjusted high color temperature image according to the embodiment of the present invention.

Please refer to FIG. 2 to FIG. 7. FIG. 2 is a diagram of distribution of red light pixels within the high color temperature image according to the embodiment of the present invention. FIG. 3 is a diagram of distribution of green light pixels within the high color temperature image according to the embodiment of the present invention. FIG. 4 is a diagram of distribution of blue light pixels within the high color temperature image according to the embodiment of the present invention. FIG. 5 is a diagram of a result of the content analyzer applied to the high color temperature image according to the embodiment of the present invention. FIG. 6 is a diagram of a regression line for adjusting the bluish image according to the embodiment of the present invention. FIG. 7 is a diagram of color light distribution of the adjusted high color temperature image according to the embodiment of the present invention.

The distribution of each color light of the high color temperature image can be acquired by detecting a color coordinates distribution histogram, or a target object with the blue color, or an optical spectrum based on color light distribution of the high color temperature image. As an example of the said spectrum, the image adjusting device 10 may utilize a spectrometer or an integrating sphere or a chroma meter to measure a ratio of a harmful blue light spectrum to a whole light spectrum, or a ratio of a harmful blue light spectrum to a blue light spectrum, or a ratio of a peak blue light spectrum to a peak non-blue light spectrum. Application of the content analyzer is not limited to the above-mentioned embodiments, and depends on an actual demand.

A curve C1 can represent a large intensity of the blue light components, such as a wavelength ranged between 380 nm and 500 nm, so that the high color temperature image may have a bluish foreground or a bluish background. The content analyzer can output analyzer data, such as a blue light power saving index, or correlated color temperature or color coordinates, to an anti-blue light strength decider for deciding the regression line (which can be shown in FIG. 6) for blue light reduction. The regression line may be optionally calibrated by panel information the display panel 12 (for example, a gamma value or vertex point values or any other calibration data for calibrating the display panel), and then applied for the curve C1 to generate the adjusted curve C2; an intensity of the blue light components in the curve C2 can be reduced and then compared with the curve C1, and intensity of the green light components and the red light components are similar between the curves C1 and C2, so as to reduce the intensity of the blue color and amend all pixels within the high color temperature image. In this embodiment, the first blue light power saving mode can be turned on for the preferred image quality, the longtime use and the reading comfort.

The anti-blue light strength decider may analyze a blue light reduction line and a tuning offset line to decide a target point on a line between the blue light reduction line and the tuning offset line. The line relevant to target points can be functioned with the calibration data to generate a blue light power saving core, and then the regression line can be generated via the blue light power saving core for pixel-wise color correction and RGB adjustment of all pixels within the original image. The pixel-wise color correction and RGB adjustment for color coordinates of the pixels can be affected by, but not be limited to, level strength decision, the image color temperature, the tuning offset line and blue light reduction line. The blue light reduction line may be set in a color chart by any possible algorithm, and can pass through a white point of the color chart to point toward a boundary point of 435 nm. The tuning offset line may be generated by rotation or offset of the blue light reduction line, and further be intersected by the blue light reduction line via the white point. Application of the anti-blue light strength decider and the blue light power saving core is not limited to the above-mentioned embodiments, and depends on the actual demand.

Figure 8:
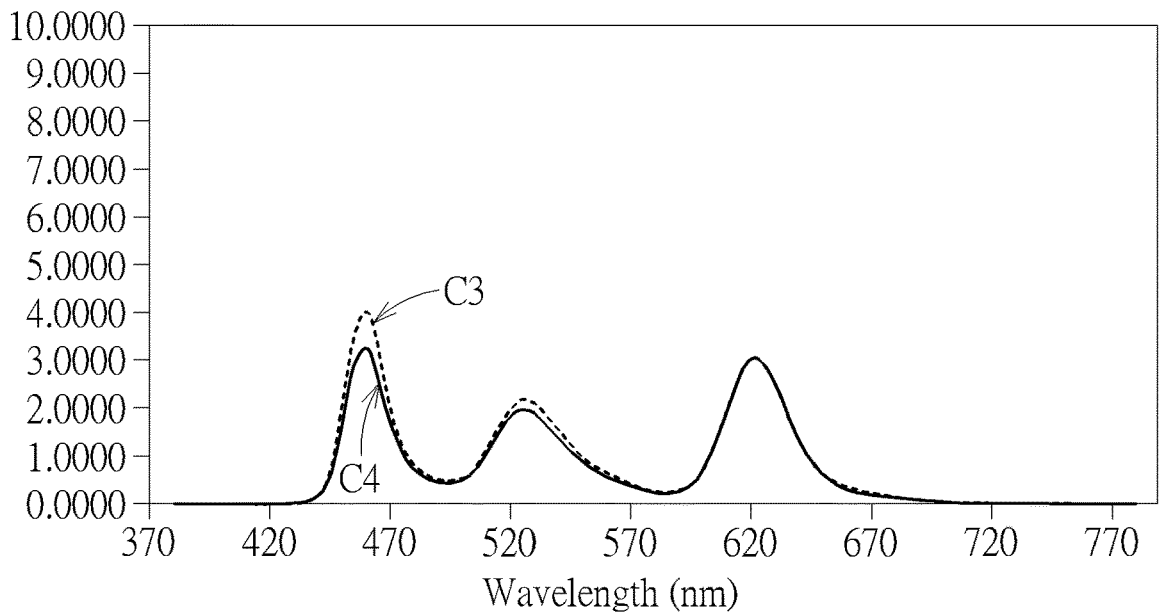
FIG. 8 is a diagram of color light distribution of the low color temperature image and the adjusted low color temperature image according to the embodiment of the present invention.

Please refer to FIG. 8. FIG. 8 is a diagram of color light distribution of the low color temperature image and the adjusted low color temperature image according to the embodiment of the present invention. The curve C3 can represent the color light distribution of the original image; an intensity of the blue light components may be similar or less than the intensity of the green light components and the red light components. The image adjusting device 10 can utilize the content analyzer and the anti-blue light strength decider and the blue light power saving core as mentioned above to acquire a related regression line (which is not shown in the figures), and then utilize the related regression line to generate the curve C4 which represent the color light distribution of the adjusted low color temperature image. In this embodiment, the second blue light power saving mode can be turned on for lower color shift and the vivid display.

It should be mentioned that the specific light power saving mode of the image adjusting device 10 can not only reduce the blue color (such as a blue light value), but also the green color (such as a green light value) and the red color (such as a red light value). The present invention may reduce intensity of the specific light (such as the blue light value) for energy economy, and intensity of other light (such as the green light value and the red light value) can be further reduced in a specific ratio for avoiding the serious color shift, and the image adjusting device 10 can provide preferred balance between the power saving function and the image quality. Intensity reduction is not limited to the blue color, the green color and the red color, which depends on an actual demand. For example, if the display panel 12 has only one lighting unit, the image adjusting device 10 can adjust color intensity of the said lighting unit for the preferred balance between the power saving function and the image quality.

Reduction of the intensity of the blue color (which means turning on the specific light power saving mode) can be executed to decrease blue light luminance of the original image, or decrease an operation current of the display panel 12, or decrease SOC (System on Chip) level strength; related application is not limited to the above-mentioned embodiments. A type of the display panel 12 can be, but not be limited to, OLED (organic light-emitting diodes) display, AMOLED (active-matrix organic light-emitting diode) display, Mini LED display or Micro LED display.

Figure 9:
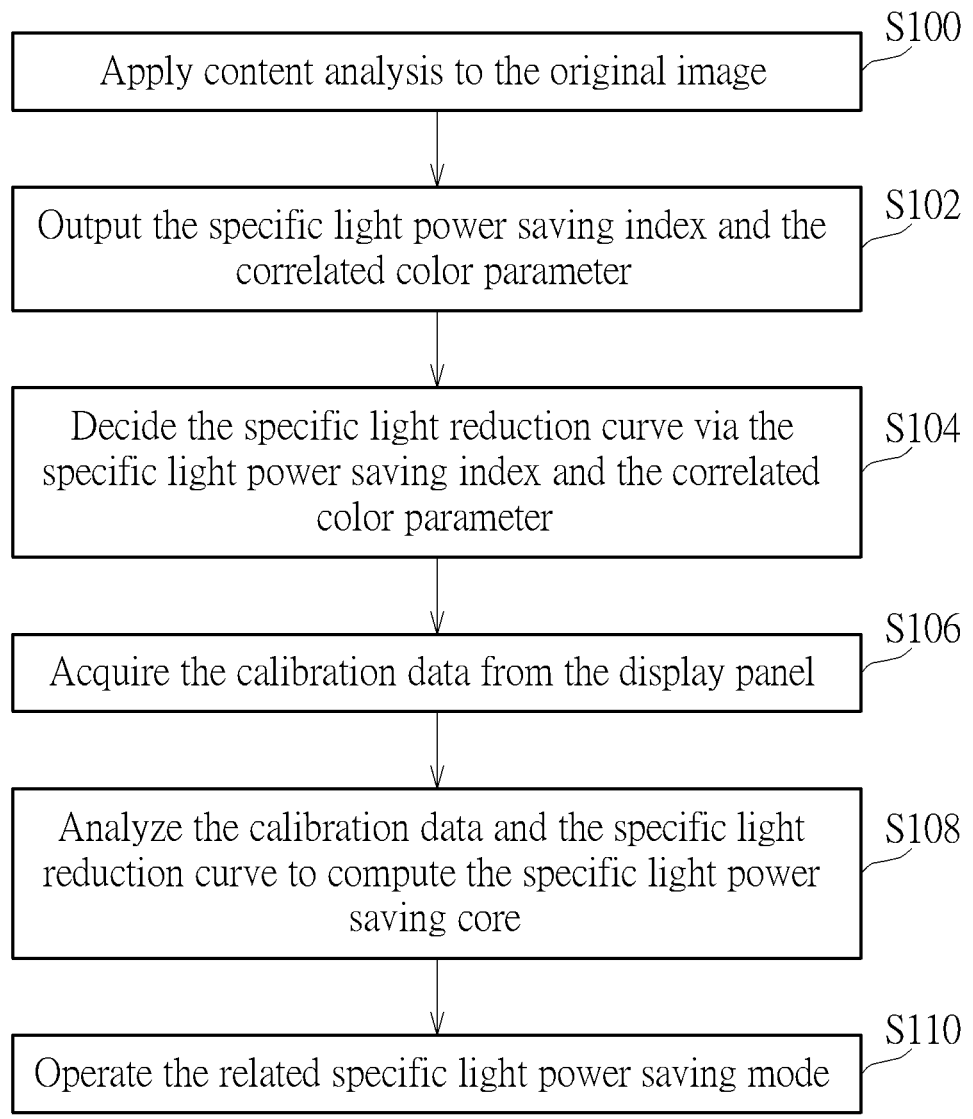
FIG. 9 is a flow chart of an image adjusting method according to the embodiment of the present invention.

Please refer to FIG. 9. FIG. 9 is a flow chart of an image adjusting method according to the embodiment of the present invention. The image adjusting method illustrated in FIG. 9 can be suitable for the image adjusting device 10 shown in FIG. 1. First, step S100 can be executed to apply content analysis to the foresaid original image. The content analysis may detect the color coordinates distribution histogram or the optical spectrum of the original image, so as to decide how to adjust the intensity of pixels within the original image; in addition, the content analysis may utilize object identification technique to detect the target object with the specific color in the original image, and adjust the intensity of pixels within a range of the target object.

Then, step S102 and step S104 can be executed to output the specific light power saving index and the correlated color parameter in accordance with a result of the content analysis, and analyze the specific light power saving index and the correlated color parameter to decide a specific light reduction curve. The correlated color parameter may be color temperature or color coordinates, which depends on the design demand. The specific light reduction curve may be interpreted as the specific light power saving mode or the regression line as mentioned above. Then, step S106 and step S108 can be executed to acquire the calibration data from the display panel 12, analyze the calibration data and the specific light reduction curve to compute the specific light power saving core, such that one related specific light power saving mode to reduce intensity of specific color of the original image can be determined in accordance with a result of the content analysis (for example, the specific light power saving core). Then, step S110 can be executed to operate the related specific light power saving mode.

In conclusion, the image adjusting method and the image adjusting device of the present invention can utilize the content analyzer to detect the scenario mode of each frame in the image stream, and choose one of the plurality of specific light power saving modes in accordance with the detected scenario mode to adjust color intensity of the original image, so as to make less color shift of different scenarios and achieve advantages of the preferred image quality and the preferred power saving efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjusting method applied to a display panel, comprising:
   applying content analysis to an original image to acquire color parameter of the original image;
   determining one related specific light power saving mode corresponding to the acquired color parameter to reduce intensity of specific color of the original image in accordance with a result of the content analysis; and
   executing the related specific light power saving mode to decide reduction amplitude of the specific color within the original image.

2. The image adjusting method of claim 1, further comprising:
   outputting a specific light power saving index and the correlated color parameter in accordance with the result of the content analysis; and
   analyzing the specific light power saving index and the correlated color parameter to decide a specific light reduction curve, wherein the related specific light power saving mode is determined in accordance with the specific light reduction curve.

3. The image adjusting method of claim 1, further comprising:
   acquiring panel information of the display panel;
   analyzing the panel information, wherein the related specific light power saving mode and the specific light reduction curve to compute a specific light power saving core; and
   selecting the related specific light power saving mode in accordance with the specific light power saving core.

4. The image adjusting method of claim 1, further comprising:
   adjusting the intensity of the specific color of the original image by at least one of level strength decision, an image color temperature, tuning offset and a specific light reduction curve.

5. The image adjusting method of claim 1, further comprising:
   detecting a color coordinates distribution histogram of the original image, a target object with a specific color in the original image or a spectrum based on color light distribution of the original image for the content analysis.

6. The image adjusting method of claim 1, further comprising:
   classifying the original image into a first scenario mode or a second scenario mode in accordance with the content analysis; and
   selecting a first specific light power saving mode or a second specific light power saving mode from the plurality of specific light power saving modes by a classification result of the original image.

7. The image adjusting method of claim 6, wherein the first scenario mode is relevant to a high color temperature image and suitable for the first specific light power saving mode with large reduction, the second scenario mode is relevant to a low color temperature image and suitable for the second specific light power saving mode with less reduction.

8. The image adjusting method of claim 1, wherein the related specific light power saving mode is executed to decrease specific light luminance of the original image, or an operation current of the display panel, or SOC level strength for reducing the intensity of the specific color.

9. The image adjusting method of claim 1, further comprising:
   adjusting a lighting unit adapted to emit the specific light of the display panel for reducing the intensity of the specific color.

10. The image adjusting method of claim 1, further comprising:
    adjusting a lighting unit adapted to emit another light excluding the specific light of the display panel for reducing the intensity of the specific color.

11. An image adjusting device applied to a display panel, comprising:
    an operation processor adapted to apply content analysis to an original image to acquire color parameter of the original image, determine one related specific light power saving mode corresponding to the acquired color parameter to reduce intensity of specific color of the original image in accordance with a result of the content analysis, and execute the related specific light power saving mode to decide reduction amplitude of the specific color within the original image.

12. The image adjusting device of claim 11, wherein the operation processor is further adapted to output a specific light power saving index and the correlated color parameter in accordance with the result of the content analysis, analyze the specific light power saving index and the correlated color parameter to decide a specific light reduction curve, wherein the related specific light power saving mode is determined in accordance with the specific light reduction curve.

13. The image adjusting device of claim 11, wherein the operation processor is further adapted to acquire panel information of the display panel, analyze the panel information, wherein the related specific light power saving mode and the specific light reduction curve to compute a specific light power saving core, and select the related specific light power saving mode in accordance with the specific light power saving core.

14. The image adjusting device of claim 11, wherein the operation processor is further adapted to adjust the intensity of the specific color of the original image by at least one of level strength decision, an image color temperature, tuning offset and a specific light reduction curve.

15. The image adjusting device of claim 11, wherein the operation processor is further adapted to detect a color coordinates distribution histogram of the original image, a target object with a specific color in the original image or a spectrum based on color light distribution of the original image for the content analysis.

16. The image adjusting device of claim 11, wherein the operation processor is further adapted to classify the original image into a first scenario mode or a second scenario mode in accordance with the content analysis, and select a first specific light power saving mode or a second specific light power saving mode from the plurality of specific light power saving modes by a classification result of the original image.

17. The image adjusting device of claim 16, wherein the first scenario mode is relevant to a high color temperature image and suitable for the first specific light power saving mode with large reduction, the second scenario mode is relevant to a low color temperature image and suitable for the second specific light power saving mode with less reduction.

18. The image adjusting device of claim 11, wherein the related specific light power saving mode is executed to decrease specific light luminance of the original image, or an operation current of the display panel, or SOC level strength for reducing the intensity of the specific color.

19. The image adjusting device of claim 11, wherein the operation processor is further adapted to adjust a lighting unit adapted to emit the specific light of the display panel for reducing the intensity of the specific color.

20. The image adjusting device of claim 11, wherein the operation processor is further adapted to adjust a lighting unit adapted to emit another light excluding the specific light of the display panel for reducing the intensity of the specific color.

* * * * *